United States Patent [19]

Glossop, Jr. et al.

[11] Patent Number: 5,054,238

[45] Date of Patent: Oct. 8, 1991

[54] WINDOW PANEL POSITION REGULATING ASSEMBLY

[75] Inventors: Donald L. Glossop, Jr., Dearborn Heights; William J. Fobar, Wyandotte; Hachig A. Gopigian, Birmingham; Charles J. Haddad, Bloomfield Hills; Thomas C. Holka, Milford, all of Mich.

[73] Assignee: Ford Motor Company, Dearborn, Mich.

[21] Appl. No.: 525,573

[22] Filed: May 21, 1990

[51] Int. Cl.$^5$ ............................................. E05F 11/52
[52] U.S. Cl. ........................................ 49/211; 49/214; 49/375
[58] Field of Search ................. 49/211, 213, 375, 374, 49/376, 377, 348, 349, 350, 351, 352, 502, 227

[56] References Cited

U.S. PATENT DOCUMENTS

| | | | |
|---|---|---|---|
| 2,844,405 | 7/1958 | Roethel | 296/44.5 |
| 2,992,039 | 7/1961 | Bretzner | 49/211 X |
| 3,808,743 | 5/1974 | Renner et al. | 49/502 |
| 4,094,100 | 6/1978 | Fukumoto et al. | 49/348 |
| 4,550,529 | 11/1985 | Drouillard | 49/348 |
| 4,575,967 | 3/1986 | Bickerstaff | 49/211 |
| 4,648,205 | 3/1987 | Ono | 49/374 |
| 4,730,414 | 3/1988 | Nakamura et al. | 49/348 |
| 4,785,582 | 11/1988 | Tokue et al. | 49/211 |
| 4,788,794 | 12/1988 | Miller | 49/211 X |
| 4,927,207 | 5/1990 | Kishino | 49/374 X |

Primary Examiner—Philip C. Kannan
Attorney, Agent, or Firm—Daniel M. Stock; Roger L. May

[57] ABSTRACT

A window panel position regulating means for a vehicle door which will accommodate a doubly irregularly curved window panel and will guide the window panel through the slot at the belt line of the door in such a manner that the width of the belt line slot can be maintained at absolute minimum so as to improve the oveall appearance of the door assembly and the functional rigidity of the assembly. The regulating assembly includes a pair of guide channel members mounted within the door panel cavity at the front edge of the door and a third guide channel member mounted within the door panel cavity at the rear edge of the door. Guide follower members are mounted to the window and guided within the respective guide channel members to thereby guide the window through the belt line slot. Each guide channel member is generally curved in the direction of the curve of the window panel and has a substantially continuously variable rate of curvature distinct from that of any other guide channel member to provide that the window panel will be continuously pivoted about several axes as it is raised and lowered to allow it to pass through the belt line slot of minimum width.

18 Claims, 6 Drawing Sheets

WINDOW PANEL POSITION REGULATING ASSEMBLY

TECHNICAL FIELD

The present invention relates to a window panel position regulating assembly, and more particularly a regulating mechanism for raising and lowering a vehicle window.

BACKGROUND OF THE INVENTION

In recent years, vehicle window glass has undergone significant evolution in that increasingly dramatic styling changes have brought about the evolution of cylindrically curved door window panes including most recently, doubly curved door window panes.

The introduction of cylindrically curved windows led to significant changes in the window position regulating assemblies, particularly the window guiding system. Typical systems for raising and lowering cylindrical window panels are shown in U.S. Pat. Nos. 2,844,405, 3,808,743, 4,094,100, 4,550,529, 4,730,414 and 4,785,582. Each such U.S. patent shows a vehicle window guiding system comprising at least a single guide channel, and in some instances a pair of guide channels for guiding the raising and lowering of the window pane along a curvlinear path.

With the coming of doubly curved vehicle window panels greater design demands are to be placed on the regulating assemblies for raising and lowering such panels.

The term "doubly curved" refers to a window panel which is not only curved in the direction about the horizontal axis of the vehicle being primarily apparent in the front and rear views of the vehicle, but also curved in the third dimension i.e. about a somewhat vertical axis of the vehicle being primarily apparent in the plan view of the vehicle.

Stated otherwise, a doubly curved window pane is one which is generally convex to the vehicle exterior axis parallel to the centerline of the vehicle and a somewhat vertical axis approximately parallel to the tumblehome in front view of the vehicle. In the truest sense, this invention concerns a window which should be referred to as doubly irregularly curved to provide a truly aerodynamically shaped vehicle. In irregularly curved glass, the degree of convexity of the window is not uniform along any axes. In other words, the rate of curvature is not constant. For example, to produce an aerodynamically advantageous continuous surface, the instantaneous radius of curvature on both the vertical and horizontal sections will be greatest at the upper and forwardmost edges of the window pane.

Were the aforesaid previously known systems to be employed to raise and lower such a window panel, the slot at the belt line of the door through which the window must pass would have to be extremely wide.

In other words, a slot within the door panel at the belt line for passing the window from the fully raised condition to a fully open position must accommodate the depth of the window pane as defined by the degree of convexity as well as the overall uniform cross-sectional thickness of the window pane itself. The task is similar to getting a chair through a doorway. If one were to try and pass a chair straight-on through the doorway, the doorway would have to at least equal the width of the chair. On the other hand, were one to tilt or rotate or pivot the chair as it is passing through the slot defined by the doorway, one could pass a chair of greater width than the width of the doorway. It is upon this general principle that the present invention is based.

An improvement over the aforesaid prior art systems is offered by the system shown in U.S. Pat. No. 4,648,205 wherein the front and rear vertically oriented guide channels are each provided with a different radius of curvature. That is, the front guide channel has a sharper radius of curvature than the rear. Consequently, a cylindrically curved window having a very modest degree of curvature about the somewhat vertical axis of the vehicle can be reasonably accommodated.

However, such a system is not well suited to accommodate a doubly curved window, especially a doubly irregularly curved window having vertical sections along the window where the window curvature is not a radius. The guide channels described in U.S. Pat. No. 4,648,205 do not induce the window to oscillate in plan view side-to-side at different rates at the front and rear as it is raised or lowered, which as explained in detail below is the key to maneuvering a doubly curved cylindrical window panel within a door panel slot of minimum dimension.

SUMMARY OF THE INVENTION

The present invention contemplates a window panel position regulating means for a vehicle door which will accommodate a doubly irregularly curved window panel and will guide the window panel through the slot at the belt line of the door in such a manner that the width of the belt line slot can be maintained at absolute minimum so as to improve the overall appearance of the door assembly and the functional rigidity of the assembly.

More specifically, the invention contemplates a vehicle body door including:

an interior door panel and an external door panel joined together in spaced relation and providing a door cavity therebetween which terminates at the upper edge of each such door panel in an elongated slot, a window panel adapted to be raised and lowered within the door cavity and through the slot, guide means within the door cavity for guiding said window panel through the slot as the window panel is raised or lowered, the guide means including means for tilting the window panel at variable rates and/or in varying direction (i) along a somewhat vertical axis (primarily apparent in the plan view of the vehicle) throughout any part of the extent of travel from a fully raised position to a fully lowered position, and (ii) along a substantially longitudinal axis at variable rates and/or in varying direction throughout any part of the extent of travel from a fully raised position to a fully lowered position, whereby said window panel will be substantially continuously pivoting about at least one of several axes as it is raised and lowered, thereby adjusting the plane of the window panel at the slot so as to pass through a slot of minimum width.

Additionally, the present invention contemplates means for causing the bottom edge portion of said window panel to appear substantially flush with said outer door panel upon reaching a substantially fully raised position.

The present invention further contemplates a vehicle door and window panel construction wherein a doubly irregularly curved window panel is substantially flush with the outer door panel at the belt line and the other edges could be perfectly flush with the remainder of the window panel opening as defined by the surrounding surface of door, window frame or vehicle body.

The above objects and other objects, features, and advantages of the present invention are readily apparent from the following detailed description of the best modes for carrying out the invention when taken in connection with the accompanying drawings.

BEST MODE FOR CARRYING OUT THE INVENTION

Figures 1, 2, 3:
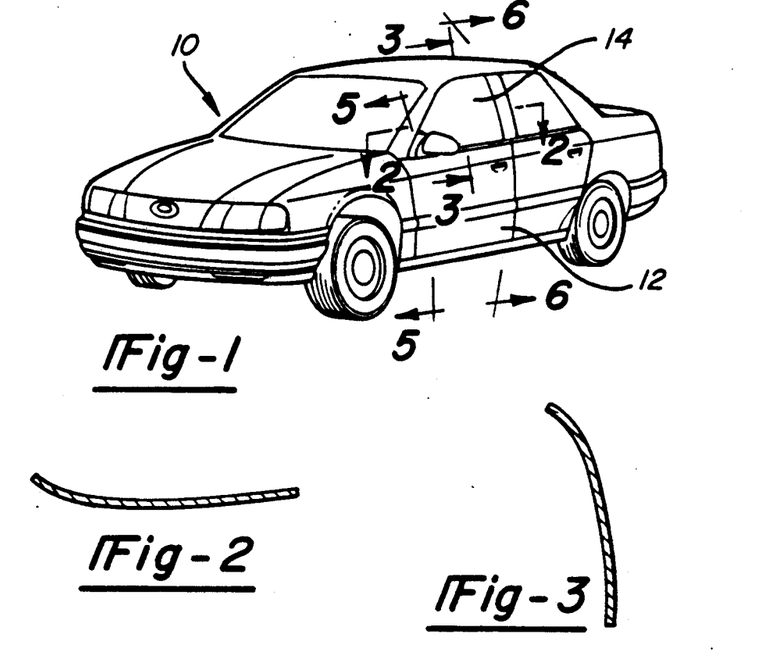
FIG. 1 is a perspective view of a vehicle body illustrating in particular the vehicle side door and window pane for which the present invention is adapted.
FIG. 2 is a sectional view taken substantially along the line 2—2 of FIG. 1 and illustrating the irregular curvature of the window pane in a horizontal plane.
FIG. 3 is a sectional view taken substantially along the line 3—3 of FIG. 1 and illustrating the irregular curvature of the window pane in the vertical plane.

In FIG. 1, there is shown a motor vehicle, designated generally at 10, of basic design illustrating the aerodynamic enhancement of the vehicle that is provided by doubly irregularly contoured glass in at least the vehicle front side door 12. The doubly irregularly curved window pane 14 incorporated into the side door assembly is shown in cross section at FIGS. 2 and 3 at specific sections taken along the section lines indicated. While not readily apparent from FIGS. 2 and 3, it is to be known that the rate of curvature through each cross section varies continuously as with a compound curve.

Figure 4:
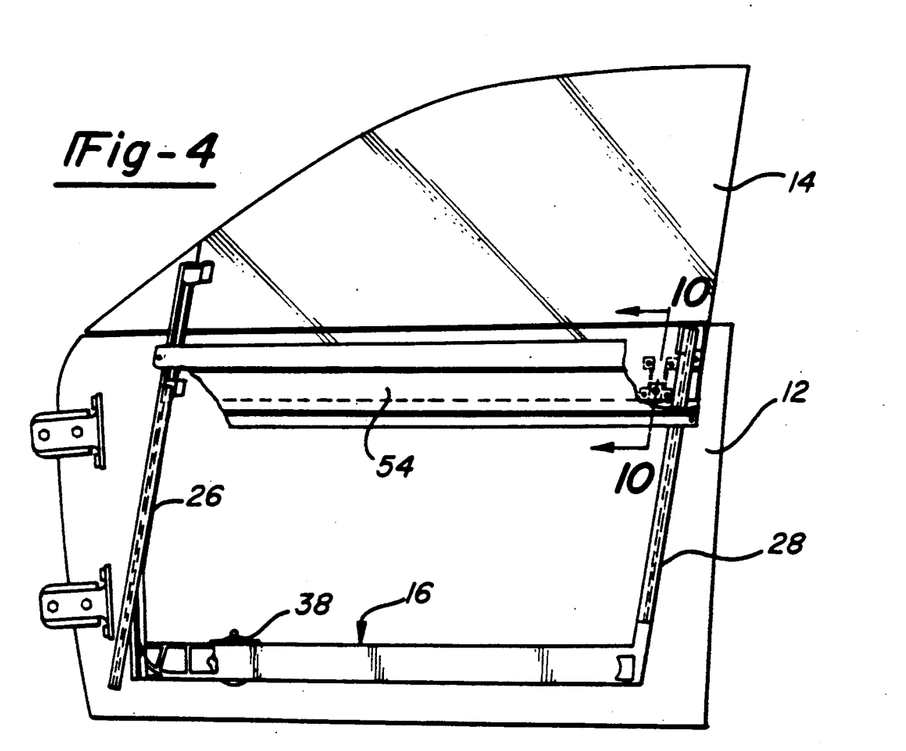
FIG. 4 is a side elevation view of the window pane and door assembly to which the present invention is practically applied.
Figure 5:
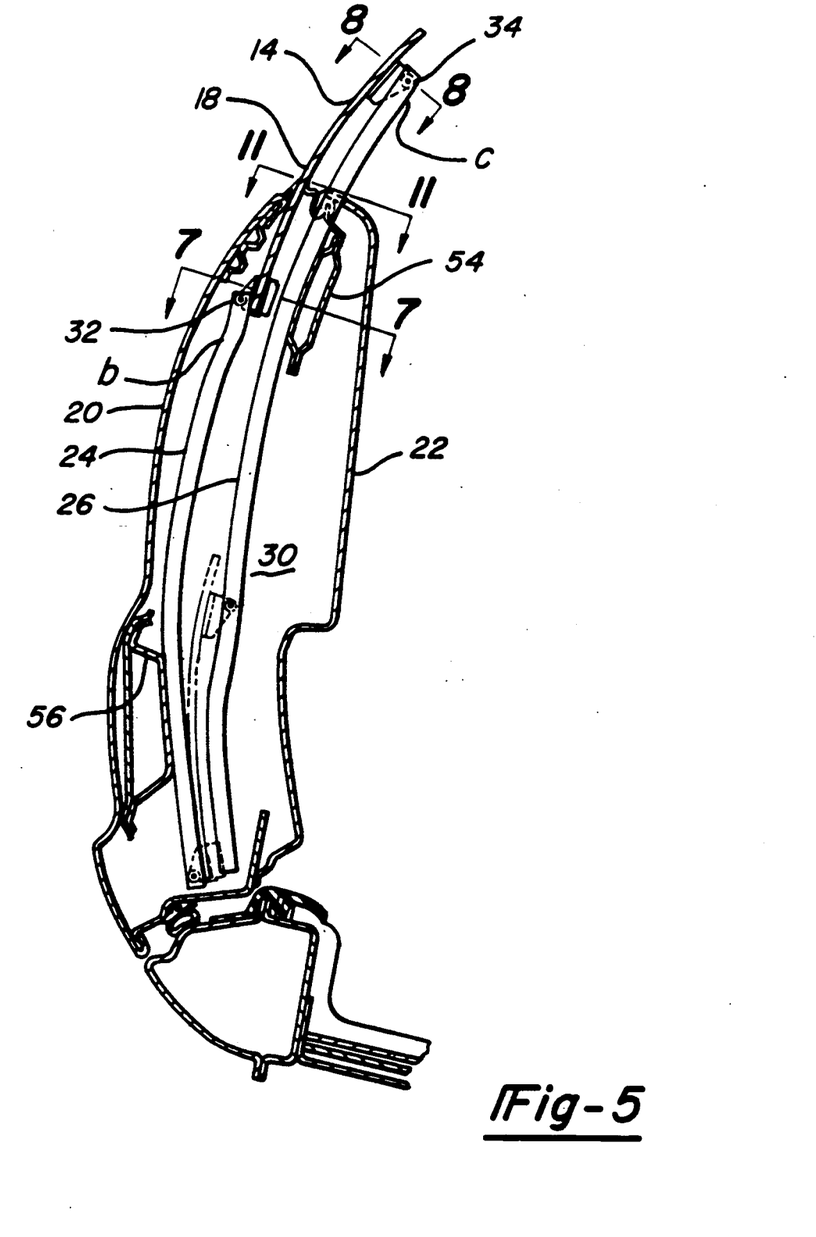
FIG. 5 is sectional view taken substantially along the of line 5—5 of FIG. 1.
Figure 6:
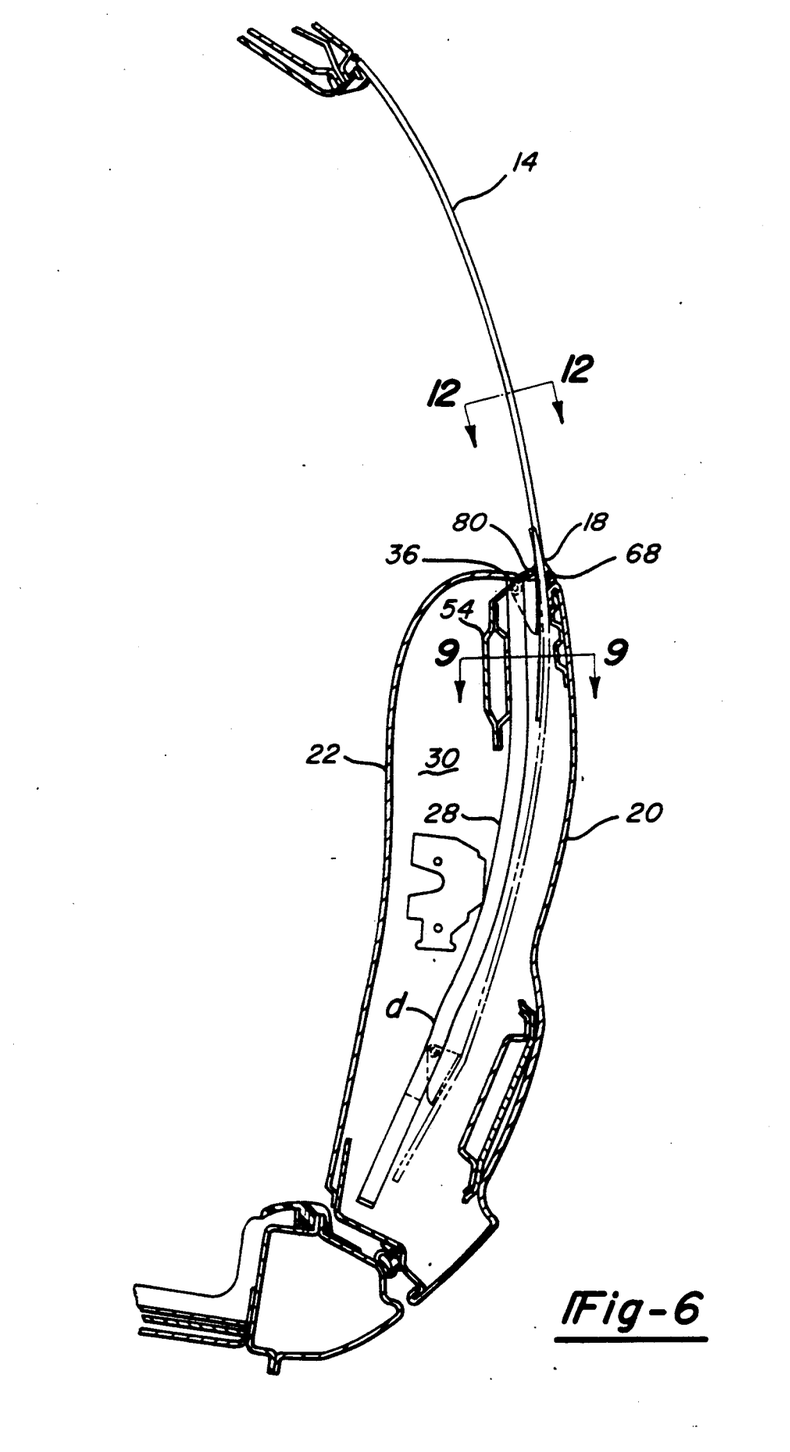
FIG. 6 is a sectional view taken substantially along the line 6—6 of FIG. 1.

In FIG. 4, 5 and 6, the general assembly of the vehicle side door 12, the window panel 14 and the regulating means, designated generally at 16, for raising and lowering the window panel within the door is shown in detail.

As seen in FIGS. 5 and 6, the window panel 14 is guided to pass through a slot 18 defined by outer and inner door panels 20 and 22, respectively. The longitudinal extent of slot 18 is known a the "belt line" and will hereafter be referred to as such. The window is supported and guided by a pair of guide channel members 24 and 26 located generally at the front edge of the window panel and a rear guide channel member 28 located at the rear edge of the window panel. Each of the guide channel members 24, 26 and 28 are located within the door cavity 30 as defined by the outer and inner door panels 20 and 22, respectively. The window panel includes a plurality of guide followers in the form of track rollers 32, 34, and 36 affixed to the window panel by an appropriate means, as described in detail with respect to FIGS. 7-9.

The regulating means 16 shown is an apertured tape-type window regulator drive including a drive motor 38 which powers a continuous tape (not shown). The tape is operatively associated with the bottom edge portion of the window pane, in a manner not shown, to raise or lower the window pane dependent on the direction of the drive motor 38. Window regulator 16 forms no part of the present invention and could be of any other construction including a hand crank mechanism.

As seen in FIG. 5, the front guide channel members 24 and 26 define a certain travel path for the window pane 14 beginning at the position indicated in phantom line. In this position, the lower front track roller 32 which is affixed to the lower front edge of the window panel 14 is located at the bottom of guide channel member 24. Upper front track roller 34, which is affixed to the front edge of the glass panel 14 at a point above the belt line when the window is in the fully raised condition, is operatively associated with guide channel member 26. The fully raised condition of the window panel is indicated in solid line in FIG. 5.

Similarly, in FIG. 6, it is to be noted that the window panel in its lowermost position is indicated in phantom line and in its fully raised position in solid line.

Each guide channel member 24, 26 and 28 is seen to be generally the shape of an arc scribed about the horizontal center line of the vehicle. However, the rate of curvature for each of the guide channel members 24, 26 and 28 is not equal or constant throughout the window panel travel path. Nor does the rate of curvature at any one point of elevation or travel of one guide channel member necessarily equal that of the remaining guide channel members. Any such equality would be coincidental for reasons explained below. Further, it will be noted that the guide channel members 24, 26 and 28 are inversely curved at points a, b, c, and d for reasons which are also explained more fully below.

Figures 7, 8, 9, 10:
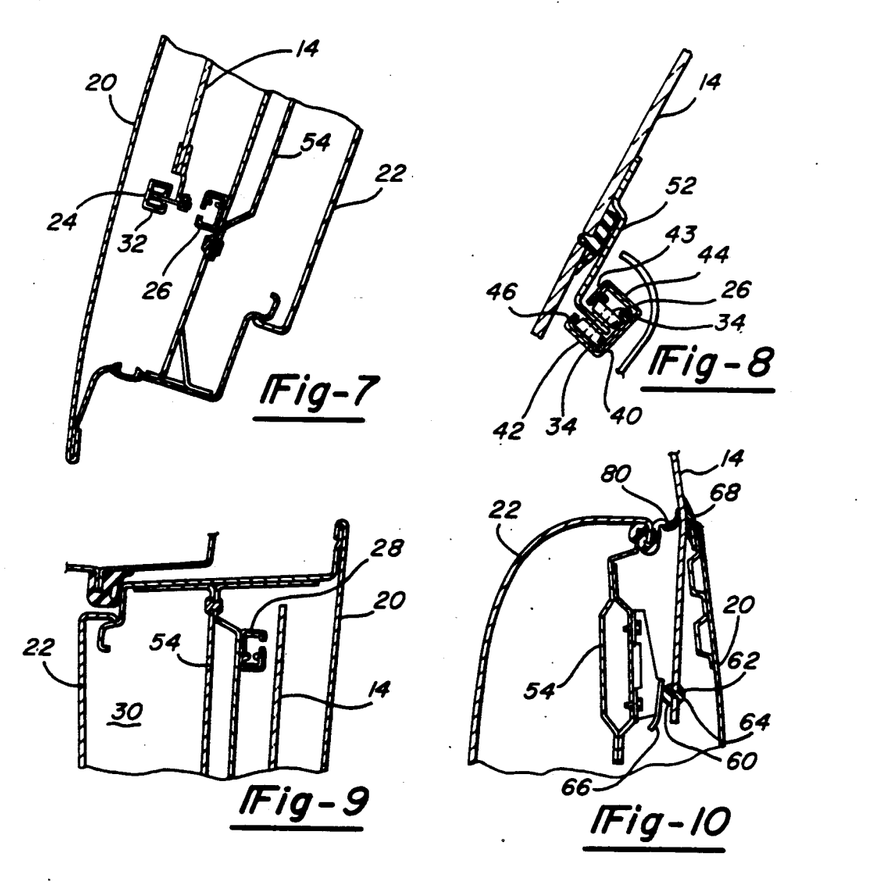
FIG. 7 is a partial sectional view taken along the line 7—7 of FIG. 5 and illustrating the forwardly directed part of window regulating guide members in accordance with the present invention.
FIG. 8 is a sectional view taken substantially along the line 8—8 of FIG. 5 and particularly illustrating the interior forwardly directed guide member and guide follower assembly in accordance with the present invention.
FIG. 9 is a sectional view taken along the line 9—9 of FIG. 6 and illustrating particularly the rearwardly directed guide member and follower assembly in accordance with the present invention.
FIG. 10 is a sectional view taken substantially along the line 10—10 of FIG. 4 and illustrating the manner in which the window pane is laterally transferred to a flush condition with the outer door panel in accordance with the present invention.

Looking now at FIGS. 7-9, there is shown the details of the construction of the respective track roller and guide channel member assemblies.

Each guide channel member 24, 26 and 28 is generally identically constructed. For example, looking at FIG. 8, guide channel member 26 is substantially U- shaped and includes a base wall 40 and side walls 42 and 44, each of which are turned over at their ends inwardly as shown at 46 and 48 to contain track roller member 34. Track roller member 34 comprises a pair of tapered track rollers 50 mounted on a common rotational axes. Track rollers 50 are carried by bracket member 52 affixed to the window panel. The remaining guide channel members 24 and 28 and respective track roller members 32 and 36 are similarly constructed. The guide channel members 26 and 28 are connected to intermediate strengthening member 54 extending from the front edge of the door to the rear edge of the door. Similarly, guide channel member 24 is connected to a further longitudinally extending strengthening member 56 within the door cavity 30. Any other means of mounting the guide channel members to the door structure would also be acceptable.

In operation, and looking particularly at FIGS. 4–6, it will be noted that as the window panel 14 is raised from its lowermost position, the difference in the degree of curvature at any one point in the upward travel of the window panel is constantly varied. Thus, the lateral distance between the axis defined by track roller 34 and that defined by track roller 32 is constantly varying. This then causes the window panel to pivot about the axes of each track roller, including the axes of track roller 36 at the rear edge of the window panel. There is sufficient freedom in the track roller and guide channel assembly that a limited degree of pivoting or tilting as determined by the rate of curvature of the guide channel members can be accommodated. Thus, the window panel will be tilted in a generally lateral plane at the vehicle door belt line as the window panel is passing through the slot. This lateral tilting will cause the window panel to be, in effect, tilted so that the curvature of the glass panel at that particular point will be presented in a manner representing the minimum depth of the glass panel, thus allowing the slot to be designed at the minimum width necessary to pass the glass panel.

Track rollers 34 and 32 also define a vertical tilt axis relative to track roller 36 within rear guide channel member 28. Since the rate of curvature between front guide channel member 26 and rear guide channel member 28 is variable, the degree of variance will determine the amount that the window panel will tilt about the vertical axis defined by track rollers 32 and 34.

Looking at FIGS. 5 and 6, for example, it will be noted that rear guide channel member 28 is inversely curved at a point d at the lowermost position. Front guide channel member 24 includes no similar inverse curvature. Thus, as the window panel is raised from this lowermost position, the front edge of the window panel will remain at a constant lateral position, whereas the rear edge will follow the track roller as it traverses laterally inwardly along the inverse curvature d. This in turn will cause the rear edge to pivot about the vertical axis defined by track rollers 34 and 32 thus presenting a certain minimum cross-sectional curvature of the window panel at the slot 18. As the window continues to traverse upwardly along the guide channel member 28, it is seen that the track roller 36 again moves laterally outwardly thus causing the window panel to pivot back in the opposite direction laterally outwardly about the aforesaid vertical axis. This again adjusts the cross-sectional envelope or shape of the window panel as it is passing through the slot 18 so as to accommodate the minimum width through which the glass panel at that particular point in time can be passed.

In FIG. 10, there is shown a means by which the rear edge of the window panel is forced laterally outwardly to a position stabilizing the window relative to the outer door panel. Attached at the lower edge portion of the window panel is an annular member 60 in the form of an elastomeric ball having a stem portion 62 passing through the window panel member and a deflectable head portion 64 at the other side of the window panel which holds the elastomeric ball fixed to the window panel. Mounted on the intermediate reinforcement member 54 in the door cavity is a bracket member plate 66. The plate is inclined in the direction of the outer door panel from its lowermost portion to its uppermost portion. Thus, when the window panel approaches its uppermost position as the window is being raised, the elastomeric ball 60 will engage and slide upon the lowermost portion of plate 66 and laterally transfer the lowermost edge of the window panel towards the outer door panel inducing a torque about the belt area into the window to assure sealing engagement with the upper weatherstrip seal 68. This firmly stabilizes the window relative to the vehicle.

Figure 11:
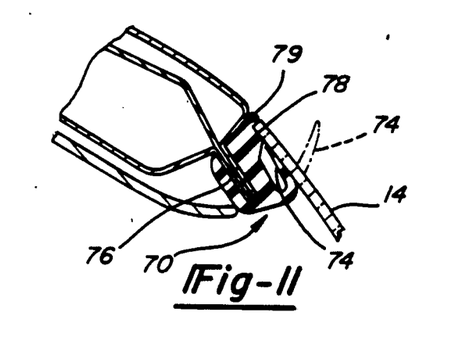
FIG. 11 is an enlarged partially sectional view of the roof panel and window panel seal assembly in accordance with the present invention and as shown in FIG. 6.
Figure 12:
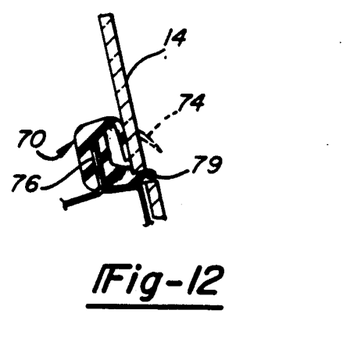
FIG. 12 is a partial sectional view taken along the line 12—12 of FIG. 6 and illustrating the side door frame seal fully engaged by the window pane in accordance with the present invention.

In FIGS. 11 and 12, there is shown the continuous weatherstrip member designated generally at 70 surrounding the window opening from the front and rear edges thereof as shown in FIG. 12 and across the roof panel as shown in FIG. 11. The details of the weatherstrip member are shown and described in copending patent application Ser. No. 457,035, filed Dec. 26, 1989 and assigned to the assignee of the present invention, the disclosure of which is incorporated herein by reference. Generally, weatherstrip member 70 includes a seal body portion 72 and a flexible elongated lip portion 74. The seal body portion includes a slot along one edge for fitting it over a flange 76 extending outwardly from the vehicle body member (or door window opening for framed door application) for purposes of securing the weatherstrip to the vehicle body member. The seal lip member, in its uncompressed state, extends radially outwardly from the seal body portion 72 in a manner as shown in phantom line in FIGS. 11 and 12. The seal lip is relatively thin in cross-section such that at its juncture with the seal body portion, it defines a flex joint. As the window panel is raised, it will first engage the seal lip 74 at its outermost extremity thereafter forcing it bend about the flex joint and come into contact with the window panel along its full length extending from the flex joint to the tip of the seal lip member. Thereafter, the window panel engages the locator portion 78 of the seal member and then the top edge of the window panel engages the bulbed gap-filling seal portion 79. The point at which the window panel 14 engages the locator portion of the seal provides additional support for the window panel, thus stabilizing it at the fully raised condition, as well as providing a positive location to assure a flush appearance.

Looking at FIGS. 13–20, the dynamics of the tilting of the window panel as it passes through the slot 18 can be observed What is shown as the slot 18 is the width between the outer and inner door panels 20 and 22, respectively, at the belt line as bounded by respective weatherstrips 68 and 80 as each is in a fully compressed state. In the fully relaxed state, i.e. when the window is fully dropped, the weatherstrips 68 and 80 on either side of the slot tend to contact each other. Thus, the line 82 represents the fully compressed condition of exterior weatherstrip 68 and the line 84 represents the fully compressed state of interior weatherstrip 80. Window 14 must pass through these boundaries 82 and 84 and a principal object of the present invention as stated earlier is that the slot width between these boundaries be maintained to the absolute minimum required to accomplish this task. This, in turn, is assured by the fact that the guide channels are designed so that the doubly irregularly curved window panel will tend to be force balanced between the weatherstrips on either side of slot 18.

Figures 13, 14:
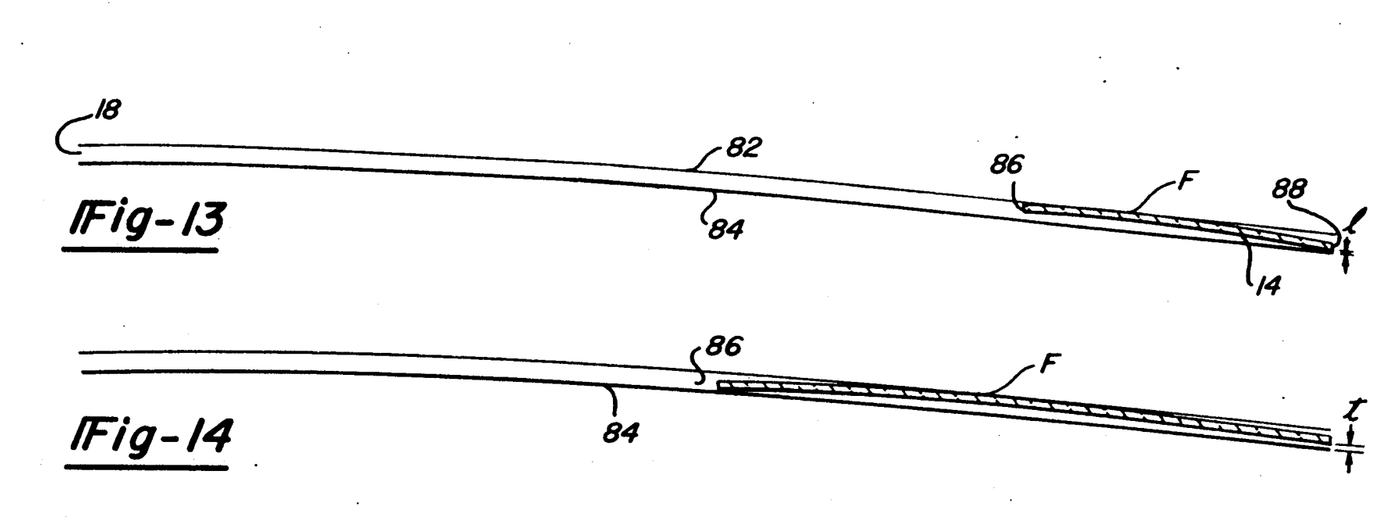
FIGS. 13-20 each show a sectional view of the irregularly curved window pane taken at the belt line of the door along the section line X—X of FIG. 5 at various stages of being raised from the near fully opened position (FIG. 13) to the nearly fully raised position (FIG. 20).
Figures 15, 16:
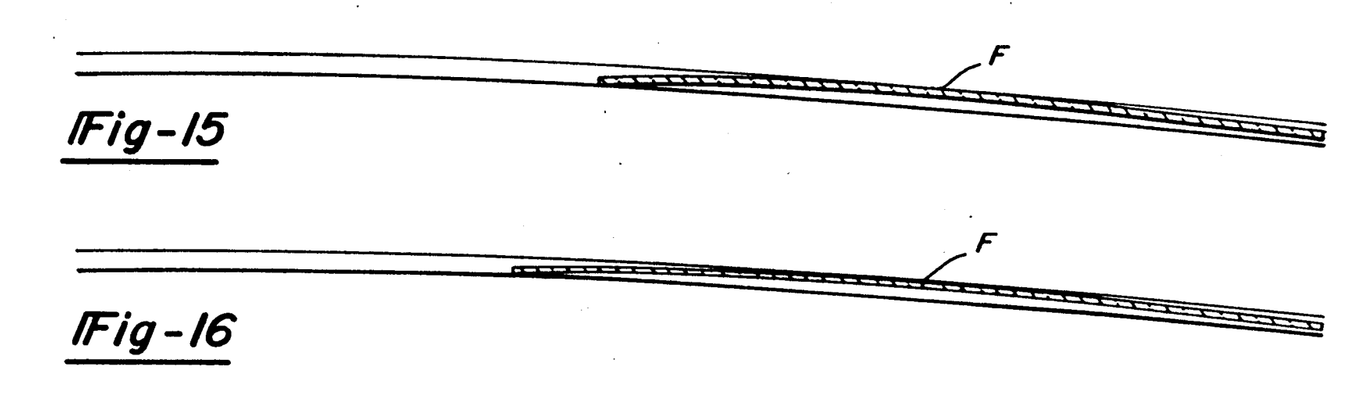
Figure 17:
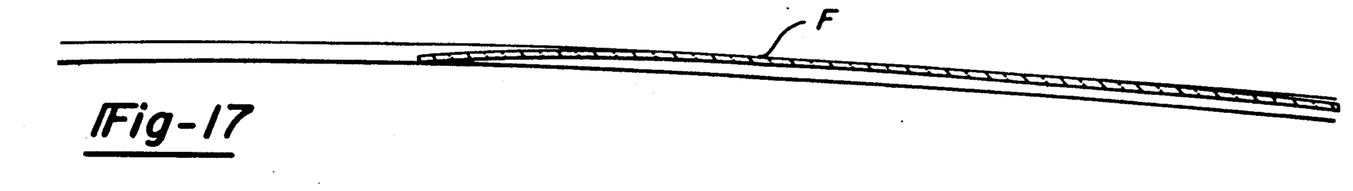
Figure 18:
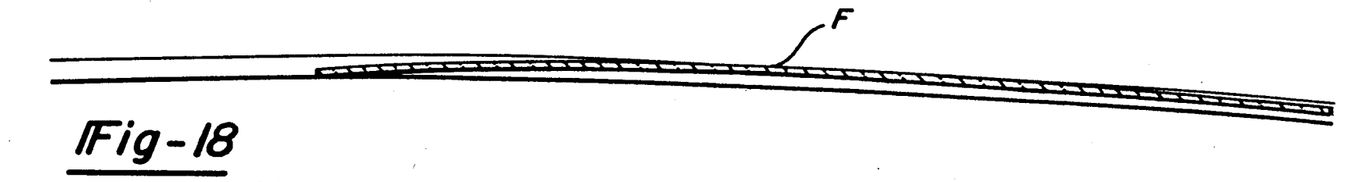

To illustrate, beginning at the representation of FIG. 13, it is seen that the window panel is close to its lowermost position. The length of the window panel, shown in cross-section, from the front edge 86 to the rear edge 88, is seen to be minimal. Further, it will be noted that the point of maximum force F exerted on the window is located very near the front edge 86 of the window panel. Weatherstrip 68 can be compressed no further. Also, it will be noted that the rear edge 88 of the window panel is fairly close to the inboard compression line 84 of the slot, as represented by the distance l, thereby indicating that the slot 18 is at the minimum width required to allow the window to pass through.

In FIG. 14, the window panel is shown in a slightly higher position. Due to the convexity of the window panel, the front edge 86 has now fully compressed inboard weatherstrip 80 and the outer surface of the window has fully compressed the outboard weatherstrip 68 at contact point F.

Further, it will be noted that the distance of the window rear edge 88 from the inboard compression line 84 of the slot has increased to a dimension t. The distance at which the rear edge of the window panel 14 is maintained from the inboard compression line 84 is controlled in part by the convexity of the glass and in part by the difference in rate of curvature between the rear guide channel member 28 relative to the front guide channel member 24 and the resultant degree of lateral displacement of the rear edge of the panel about the vertical axis defined by the front guide channel members. These adjustments are made constantly as the window panel passes through the slot as it continues to be raised as shown in FIGS. 14 through 19.

Figure 19:
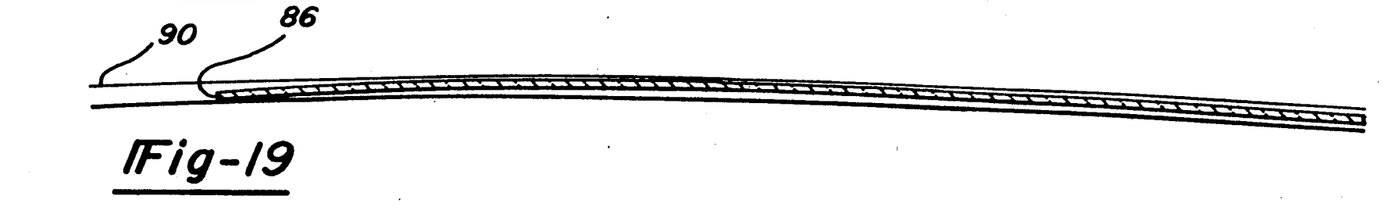

In FIG. 19, it can be seen that the window panel is very nearly in its raised position whereby the front edge 86 of the window panel is nearing the end 90 of the slot. At this point, the window front edge is the one point bearing the greatest load as it bears against weatherstrip 80. Throughout the remainder of the window cross-section, the load induced on the window by the both weatherstrips 68 and 80 is fairly uniformly dispersed.

Figure 20:
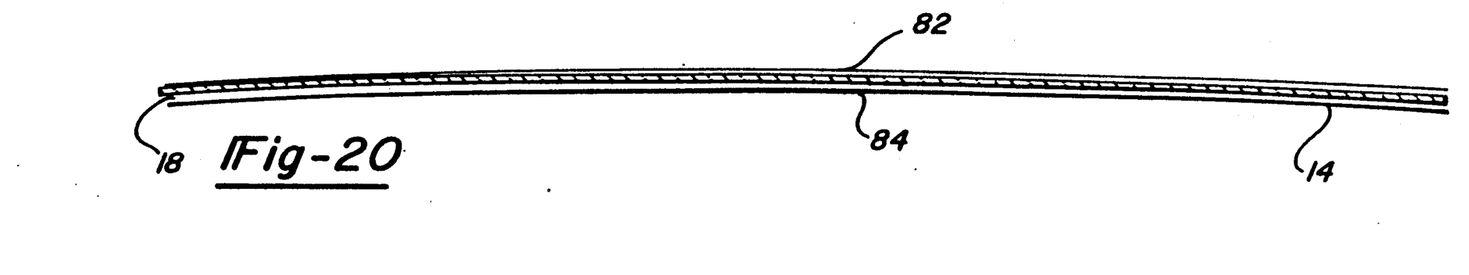

Finally, in FIG. 20, the window panel is shown in the position very close to the fully raised position and very near a flush condition with the outer door panel. At this point, the front track rollers 32 and 34 have at least begun to traverse the inversely curved portions b and c (FIG. 5) of the respective guide channel members 24 and 26, thus displacing the window panel laterally outwardly towards outer door panel 20.

Also, the slide member 60 positioned at the rear lower edge of the window panel has at least begun to traverse the door mounted inclined surface of the door mounted plate 66, forcing the rear edge of the window panel laterally outwardly a slight distance in the direction of the outer door panel and firmly stabilizing the window against weatherstrip seal 68 at the belt line and around the entire window opening against weatherstrip 70.

The window shapes or curves to be accommodated by the present invention are those ranging from a No. 1 true sweep to a 500 millimeter (mm) radius in plan view as shown in FIG. 2, and from a No. 1 true sweep to an irregular radius as small as 50 mm in rear view as shown in FIG. 3. Briefly, in automobile body design, the sweep number is the number of eighths of an inch between a constant radius arc and its chord when the chord length is 60 inches.

While the best mode for carrying out the invention has been described in detail, those familiar with the art to which this invention relates will recognize alternative designs and embodiments for practicing the invention. For example, the invention has been described most particularly relative to a vehicle door window regulating system whereas it is equally applicable to other non-fixed vehicle windows, such as tailgate windows. Furthermore, it need not be limited to use on vehicles, and would have application anywhere a doubly curved window panel is to be raised and lowered through an enclosing panel structure slot of minimum dimension.

Thus, the above described preferred embodiment is intended to be illustrative of the invention which may be modified within the scope of the following appended claims.

What is claimed is:

1. In a vehicle body door including a interior door panel and an external door panel joined together in spaced relation and providing a door cavity therebetween, terminating at the upper edge of each such door panel in an elongated slot;

a window panel adapted to be raised and lowered within said door cavity and through said slot;

guide means within said door cavity for guiding said window panel through said slot as the window panel is raised and lowered;

said guide means including first and second guide members secured to the vehicle door at the front and rear edge portions of the window panel, respectively;

guide follower means secured to the lower edge portion of said window panel and operatively associated with said guide means for establishing a fixed travel path for the lower edge of said window panel as the same passes through said slot;

pivot means operatively associated with said window panel at a point substantially above said lower edge portion;

said guide means generally circumscribing an arc whereby as the window panel is raised or lowered it will travel in a predetermined path;

said window panel being of substantially uniform thickness and doubly curved at the exterior and interior surfaces thereof whereby at each such surface, the portion intermediate said front and rear edge portions is generally convexly shaped in the direction of the exterior surface and about a first axis and the portion intermediate the upper and lower edge portion is generally convexly shaped in the same direction and about a second axis substantially perpendicular to said first axis so as to appear generally bubble-shaped;

said window panel being irregularly curved about at least one axis of said first and second axes, the window panel having a predetermined depth as measured laterally from said front edge to said rear edge as taken at any longitudinal section of said window panel, said predetermined depth varying from a predetermined minimum depth to a predetermined maximum depth;

each said first and second guide member having a substantially continuously variable rate of curvature along the entire travel path of said guide follower means, whereby said window panel will be substantially continuously pivoting about said pivot means along said at least one axis as it is raised and lowered, thereby adjusting the plane of the window panel at the slot so as to pass through a slot of minimum width.

2. The invention as defined in claim 1 wherein,
said guide means includes a third guide member within said door cavity for guiding said window panel through said slot as the window panel is raised or lowered, second guide follower means secured to said window panel substantially above said lower edge portion at an intermediate portion and being operatively associated with said third guide member for establishing a fixed travel path for the intermediate portion of said window panel as the same passes through said slot, said second guide follower means constituting said pivot means.

3. The invention as defined in claim 1 wherein,
said at least one axis is a longitudinal axis, whereby said window panel will be substantially continuously pivoting about said pivot means along said longitudinal axis as it is raised and lowered, thereby adjusting the vertical plane of the window panel at the slot so as to pass through a slot of minimum width.

4. The invention as defined in claim 1 wherein,
said at least one axis is a vertical axis;
the degree of curvature of one said guide member at any one point as defined by a horizontal section along the travel path of said guide follower means being substantially different than that of said other guide member, whereby the window panel will be substantially constantly pivoting about said vertical axis as it is raised or lowered thereby adjusting the lateral plane of the window panel at the slot so as to pass through a slot of minimum width.

5. The invention as defined in claim 4 wherein,
said window panel is irregularly curved about said first and second axes, whereby the window panel will be substantially constantly pivoting about both said longitudinal axis and vertical axis as it is raised and lowered thereby adjusting the lateral plane of the window panel at the slot so as to pass through a slot of minimum width.

6. The invention as defined in claim 5 wherein,
said guide means includes a third guide member within said door cavity for guiding said window panel through said slot as the window panel is raised or lowered, second guide follower means secured to said window panel substantially above said lower edge portion at an intermediate portion and being operatively associated with said third guide member for establishing a fixed travel path for the intermediate portion of said window panel as the same passes through said slot, said second guide follower means constituting said pivot means.

7. The invention as defined in claim 6 wherein,
said third guide member is laterally aligned with said first guide means whereby said guide follower means within said first and third guide members define a substantially vertical axis about which said window panel may be tilted.

8. The invention as defined in claim 7 wherein,
said third guide member generally circumscribes an arc having a substantially continuously variable rate of curvature along the entire travel path of said track means.

9. The invention as defined in claim 8 wherein,
the degree of curvature of said third guide member at any one point in the travel path of said window panel of said guide follower means is substantially different than that of said first guide means whereby the window panel will be substantially constantly pivoting about a longitudinal axis as it is raised or lowered, thereby adjusting the lateral plane of the window panel at the slot so as to pass through a slot of minimum width.

10. The invention as defined in claim 9 wherein,
each of said first and second guide members includes an upper portion of inverse curvature, having an axis in the direction of said outer door panel whereby as the window panel is fully raised, said guide follower means will transfer the lower edge portion of said window panel to a point substantially flush with said outer door panel at said slot.

11. The invention as defined in claim 10 wherein,
said vehicle body door further includes stabilizing means mounted within said cavity intermediate said outer and inner door panels for engaging the window panel at said lower edge portion and transferring the lower edge portion thereof laterally toward said outer door panel as said window panel reaches its uppermost raised position, said stabilizing means being located near the rear edge portion of said window panel.

12. The invention as defined in claim 11 wherein,
each of said guide members is a substantially U-shaped channel member and the guide follower means is a track roller member extending within the U-shaped channel member and captured therewithin.

13. The invention as defined in claim 1 wherein,
at least one of said guide members includes an upper portion of inverse curvature having an axis in the direction of said outer door panel, whereby as the window panel is fully raised said track means will transfer the lower edge portion of said window panel to a point substantially flush with said outer door panel at said slot.

14. The invention as defined in claim 1 wherein,
said vehicle body door further includes stabilizing means mounted within said cavity intermediate said outer and inner door panels for engaging the window panel at said lower edge portion and transferring the lower edge portion thereof laterally toward said outer door panel as said window panel reaches its uppermost raised position.

15. The invention as defined in claim 14 wherein,
said stabilizing means includes an annular slide member affixed to said lower edge portion of the window panel, and a bracket member secured to the door and having a surface plate member inclined laterally outwardly in the direction of said outer door panel, said bracket member being secured within said door cavity at a point wherein said slide member will make first contact with said surface plate member just prior to the window panel reaching its fully raised position.

16. In a vehicle body door including an interior door panel and an external door panel joined together in spaced relation and providing a door cavity therebetween, terminating at the upper edge of each such door panel in an elongated slot;
- a window panel adapted to be raised and lowered within said door cavity and through said slot;
- guide means within said door cavity for guiding said window panel through said slot as the window panel is raised and lowered;
- said guide means including means for tilting said window panel along a substantially vertical axis at a variable rate of inclination throughout any part of the extent of travel from a fully raised position to a fully lowered position;
- said guide means further including means for tilting said window panel along a substantially longitudinal axis at a variable rate of inclination throughout any part of the extent of travel from a fully raised position to a fully lowered position;
- whereby said window panel will be substantially continuously pivoting about both said longitudinal axis and said vertical axis as it is raised and lowered, thereby adjusting the vertical plane of the window panel at the slot so as to pass through a slot of minimum width.

17. The invention as defined in claim 16 further including means for laterally transferring the bottom edge portion of said window panel to a position substantially flush with said outer door panel upon reaching a substantially fully raised position.

18. In a vehicle body door including an interior door panel and an external door panel joined together in spaced relation and providing a door cavity therebetween, terminating at the upper edge of each such door panel in an elongated slot;
- a window panel adapted to be raised and lowered within said door cavity and through said slot;
- guide means within said door cavity for guiding said window panel through said slot as the window panel is raised and lowered;
- said guide means including means for tilting said window panel along a substantially vertical axis at a variable rate of inclination and in varying direction laterally of said vertical axis throughout any part of the extent of travel from a fully raised position to a fully lowered position;
- said guide means further including means for tilting said window panel along a substantially longitudinal axis at a variable rate of inclination and in varying direction laterally of said longitudinal axis throughout any part of the extent of travel from a fully raised position to a fully lowered position;
- whereby said window panel will be substantially continuously pivoting about both said longitudinal axis and said vertical axis as it is raised and lowered, thereby adjusting the vertical plane of the window panel at the slot so as to pass through a slot of minimum width.

* * * * *